United States Patent
Pervaiz et al.

(10) Patent No.: US 7,587,824 B2
(45) Date of Patent: Sep. 15, 2009

(54) FLOW CONTROL VALVE AND METHOD FOR REBUILDING A FLOW CONTROL VALVE

(75) Inventors: Muhammad Pervaiz, Erie, PA (US); Richard Scardina, Edinboro, PA (US)

(73) Assignee: General Electric Company, Schenectady, NY (US)

( * ) Notice: Subject to any disclaimer, the term of this patent is extended or adjusted under 35 U.S.C. 154(b) by 332 days.

(21) Appl. No.: 11/469,951

(22) Filed: Sep. 5, 2006

(65) Prior Publication Data

US 2008/0054211 A1 Mar. 6, 2008

(51) Int. Cl.
 - *B21D 53/84* (2006.01)
 - *B21D 51/16* (2006.01)
 - *B23P 23/00* (2006.01)
 - *B23P 19/04* (2006.01)
 - *F16K 31/44* (2006.01)
 - *F16K 25/00* (2006.01)

(52) U.S. Cl. ............... 29/890.121; 29/402.02; 29/402.03; 29/402.05; 29/402.19; 251/160; 251/214

(58) Field of Classification Search . 29/402.02–402.06, 29/402.08, 402.11, 402.19, 888.3, 890.121; 251/160, 214, 305
See application file for complete search history.

(56) References Cited

U.S. PATENT DOCUMENTS

| | | | |
|---|---|---|---|
| 3,218,026 A | 11/1965 | Roy, Sr. | |
| 3,556,153 A | 1/1971 | Barbuto | |
| 4,548,385 A | 10/1985 | Barbuto | |
| 4,593,445 A | 6/1986 | Snyder et al. | |
| 5,360,030 A | 11/1994 | Sisk | |
| 5,911,243 A | 6/1999 | Cohen | |
| 6,308,739 B1 | 10/2001 | Barbuto et al. | |
| 6,561,517 B2 * | 5/2003 | James | 277/511 |
| 6,568,653 B1 | 5/2003 | Foresman | |
| 6,647,934 B2 | 11/2003 | Marsh et al. | |
| 6,681,793 B2 * | 1/2004 | Mike | 137/15.22 |
| 2004/0140445 A1 | 7/2004 | Pervaiz | |
| 2007/0193011 A1 * | 8/2007 | McGuire et al. | 29/402.01 |

* cited by examiner

*Primary Examiner*—David P Bryant
*Assistant Examiner*—Alexander P Taousakis
(74) *Attorney, Agent, or Firm*—Robert Wawrzyn, Esq.; Robert L. Wolter, Esq.; Beusse Wolter Sanks Mora & Maire, P.A.

(57) ABSTRACT

A method for rebuilding a flow control valve, may be performed by first providing a flow control valve having a rotor positioned in a chamber of a valve body. The rotor has a valve stem. A top cover plate is mounted to the valve body above the rotor and has a first bore through which the valve stem protrudes. The top cover plate is removed so the rotor can be removed from the valve body. A seal is positioned on the top cover plate along the first bore so that when the rotor and top cover plate are placed in or on the valve body, the flow control valve is sealed at the interface between the top cover plate and the valve stem.

8 Claims, 9 Drawing Sheets

FLOW CONTROL VALVE AND METHOD FOR REBUILDING A FLOW CONTROL VALVE

FIELD OF THE INVENTION

This invention relates generally to flow control valves. More specifically this invention pertains to valves including rotary valves and butterfly valves used in locomotive cooling systems. In addition, the present invention pertains to methods for refurbishing such valves.

BACKGROUND OF THE INVENTION

Rotors are known for use in applications where a source of fluid must be selectively directed to one of several destinations. Such valves have a rotor that can be rotated about its longitudinal axis in a chamber of a valve body. A valve stem on top of the rotor is connected to an actuator that controls the rotation of the rotor in the valve body. A top cover plate mounted to the top of the valve body has an opening through which the valve stem protrudes. An o-ring is attached to the valve stem base to seal the valve chamber and prevent fluid from leaking from the valve body.

Some larger industrial valves, or rotor used in large vehicles such as locomotives may endure up to about one million cycles. Over time, however, the valve chamber and rotor are exposed to very hot corrosive fluids; the o-ring deteriorates and separates from the valve stem base, or corrosion forms on the surface of the valve stem base. In addition, grooves may form on the valve stem because the hardness of the surface is compromised and exposed to the top cover plate because the o-ring has deteriorated.

All these factors alone, or in combination, lead to the fluid leaking from the valve chamber. Leaking from closed systems, such as a cooling system in a locomotive is unacceptable. Such systems require zero leaking. For example one drop per minute from such systems is considered significant and will adversely affect the performance of the system and locomotive. Moreover, fluid may leak from the valves onto other components of the locomotive potentially damaging such components.

Similar failure modes can be found in butterfly valves, which are mounted in a flow line and operate between an open and closed position to allow the free flow of fluid and stop the flow or fluid respectively. A typical butterfly valve includes a housing including two semicircular portions affixed to one another. A disc, the valve portion, is mounted within the housing on two diametrically opposed valve stems that are inserted through similarly opposed apertures. An actuator, connected to one of the valve stems, controls movement of the disc by rotating the valve stem about its longitudinal axis.

Typically, the valve stem is connected to a shaft, which is connected to the actuator. The valve stem and shaft are encased within a casting. A bushing, or similar fitting, supports the shaft within the housing. An o-ring is disposed between the outside surface of the bushing and inside surface of the casting to form a seal between the bushing and casting.

A seal is affixed to the inside surface of the housing to prevent leaking from the housing. However, fluid tends to leak at the junction of the seal and valve stem. Over time, the o-ring between the bushing and the casting will deteriorate and separate from the bushing and casting, causing fluid to leak into the actuator, which may eventually fail.

BRIEF DESCRIPTION OF THE INVENTION

The present method for rebuilding a flow control valve, may be performed by first providing a flow control valve having a rotor positioned in a chamber of a valve body. The rotor has a valve stem. A top cover plate is mounted to the valve body above the rotor and has a first bore through which the valve stem protrudes. The top cover plate removed so the rotor can be removed from the valve body. A seal is positioned on the top cover plate along the first bore so that when the rotor and top cover plate are placed in or on the valve body, the flow control valve is sealed at the interface between the top cover plate and the valve stem.

In an embodiment, a second bore is formed in the top cover plate and the second bore is coaxially aligned with respect to the first bore. The second bore has a diameter that is larger than a diameter of the first bore thereby forming a lip between the first bore and second bore. In this manner, the seal may be positioned on the lip in the top cover plate. In addition, the outer surface of the valve stem may be replaced by a higher grade and finished stainless steel. An outside diameter of at least a portion of the valve stem is reduced and a bushing is placed over the valve stem covering at least that portion of the valve stem having been machined. The bushing is preferably fabricated from a higher-grade stainless steel than the valve stem and is less susceptible to corrosion. When the flow control is reassembled, the seal is disposed between the top cover plate and the bushing to seal the flow control valve.

The present invention may also encompass the rebuilding of a butterfly valve, wherein the butterfly valve includes a circular valve body and a disc-shaped valve mounted to the valve body. A valve stem is connected to the valve wherein the valve stem is positioned within a housing and is attached to a bushing mounted within the housing. The bushing has a base section, a portion of which is threaded for mounting the bushing in the housing, and a top section to which an o-ring is attached to form a seal between the housing and bushing.

The bushing is removed from the housing, and the o-ring is removed from the bushing. The height of the bushing is reduced by removing a predetermined portion of the top section. The o-ring is then placed on the top section of the bushing, or a new o-ring may be used. A seal is then positioned within the housing. The bushing is then inserted into the housing, onto the valve stem and below the seal whereby the seal abuts the o-ring on the bushing and the top section of the bushing. In addition, the seal abuts the housing and valve stem to form a seal at the interface of the housing, valve stem and bushing.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE INVENTION

Figures 1, 2:
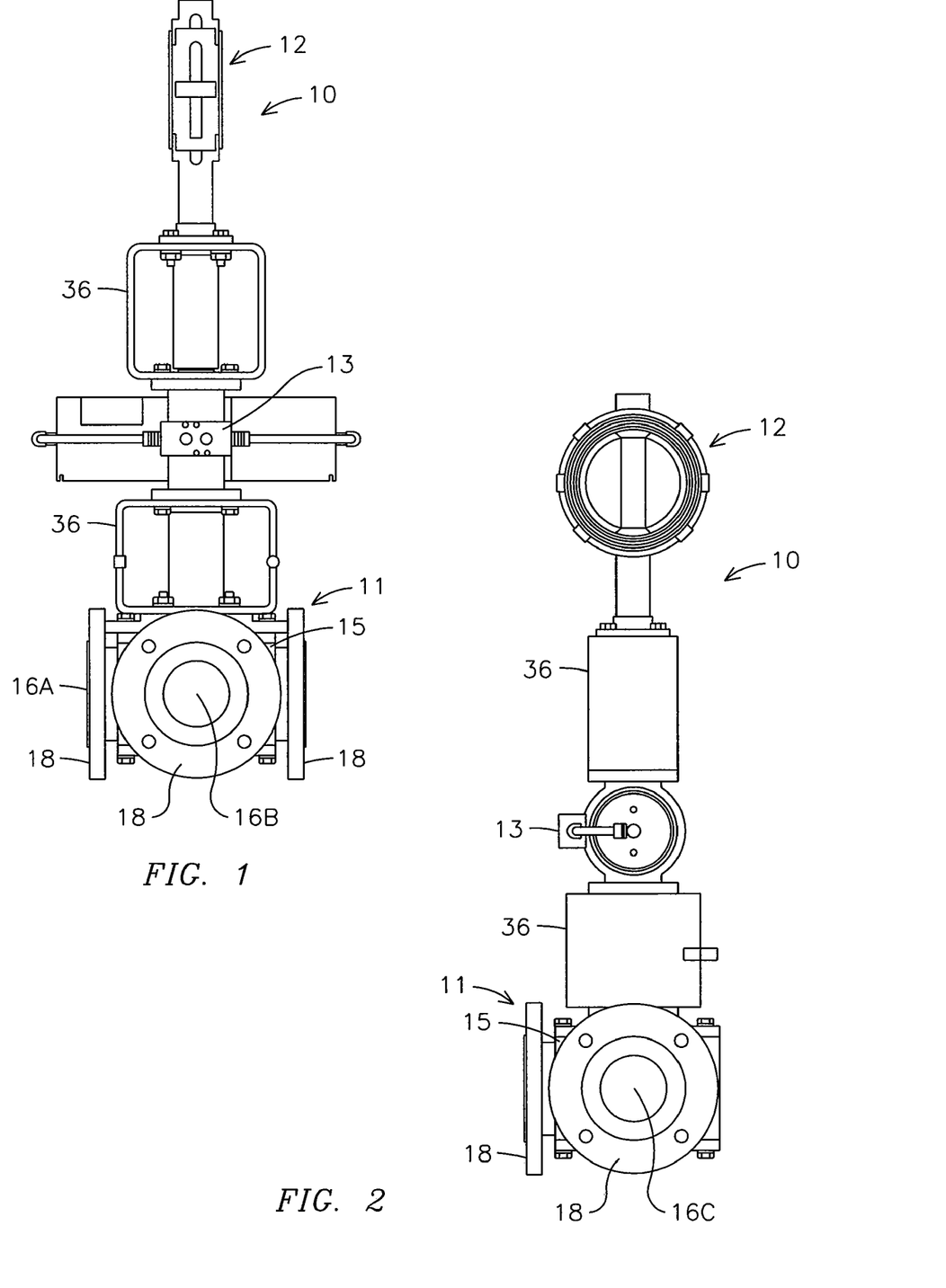
FIG. 1 is front elevational view of a flow control valve including a rotary valve and a butterfly valve coupled to an actuator
FIG. 2 is a side elevational view of a flow control valve shown in FIG. 1.

The flow control valve assembly 10 is depicted in FIGS. 1 and 2, and includes a rotor 11 and a butterfly valve 12 coupled to an actuator 13. It should be understood, that although the assembly 10 depicted in FIGS. 1 and 2 includes the rotor 11 and butterfly valve 11, the present invention might be practiced with an assembly that incorporates only one of the valves 11 and 12. Moreover, the present invention is not limited to the three-way rotor 11, but may be practiced with rotors having other port arrangements. The invention disclosed herein was tested on the above-described valve assembly manufactured Lenti Olajipari Gepgyar (Oil Industry Machine Factory) located in Lenti Hungary and Quality Controls, Inc. located in Northfield, N.H.

Figures 5, 6, 7:
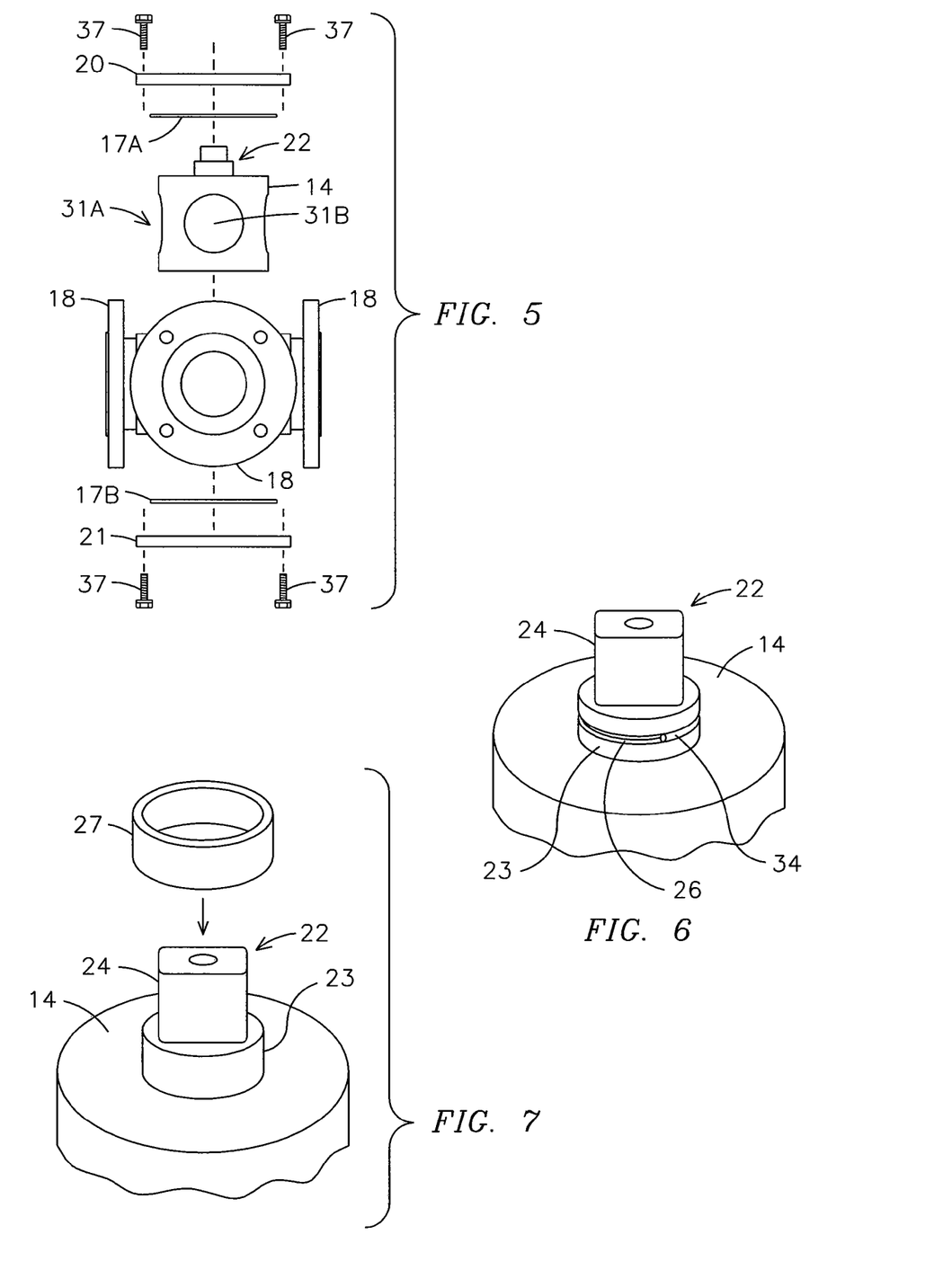
FIG. 5 is an expanded elevational view of the rotary valve.
FIG. 6 is a perspective view of a rotary valve stem.
FIG. 7 is a perspective view of a new bushing being placed over the rotary valve stem.
Figure 8:
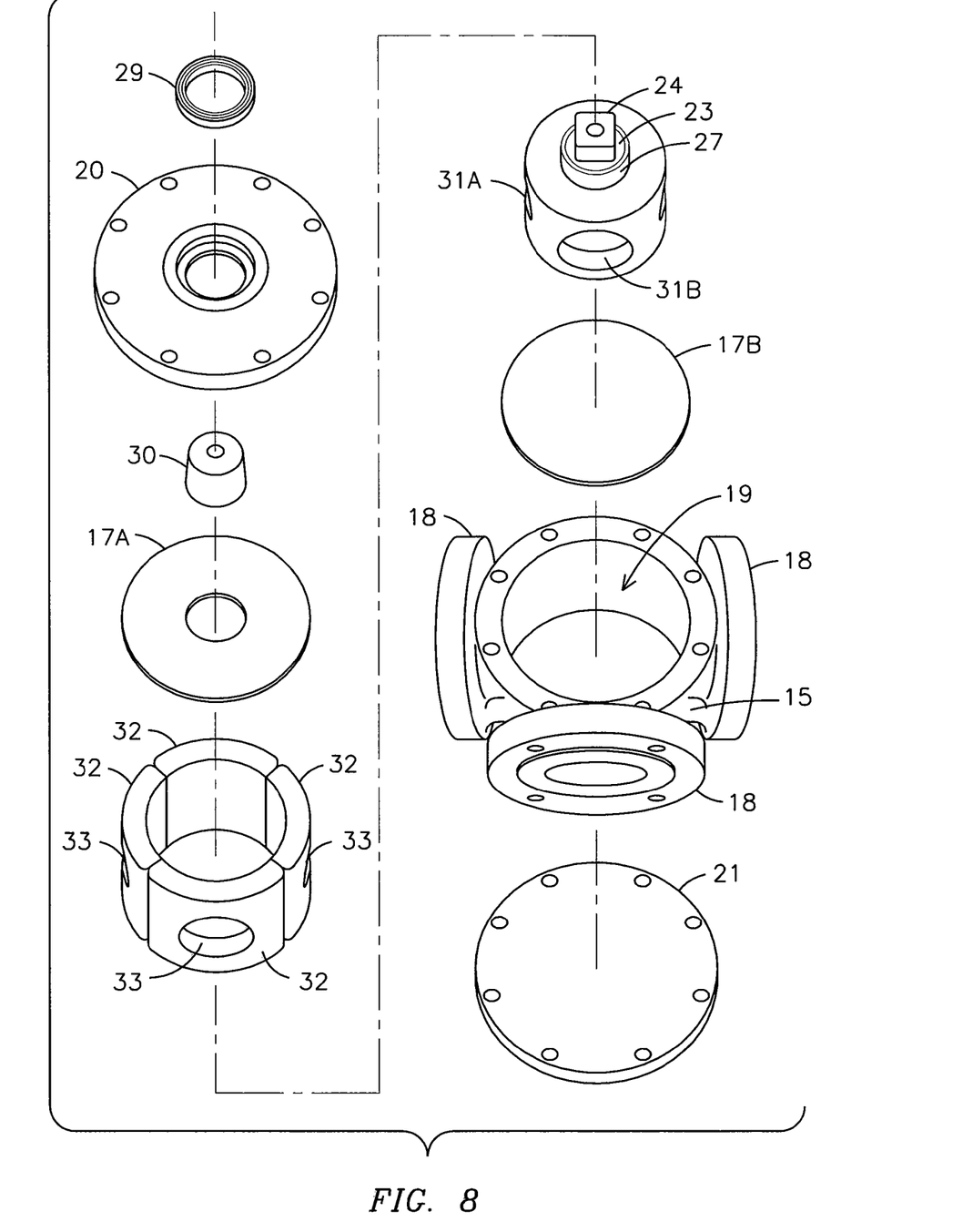
FIG. 8 is an expanded view of the assembly of the rotary valve.

The rotor 11 includes a rotor 14 disposed within a chamber 19 in a valve body 15 having one or more ports 16A, 16B and 16C, as shown in FIGS. 5 and 8. The rotor 11 is connected to piping by flanges 18 integrally formed on the valve body 15. The rotor 14 has a cylindrical configuration with ports 31A and 31B for fluid flow through the valve body 15. The rotor 14 is dimensioned to provide an annular clearance between the rotor 14 and an inside wall of the chamber 19. Seal pads 32 are disposed between the rotor 14 and inside wall of the chamber 19, and have openings 33 corresponding to the ports 16A-16C, to allow fluid flow through the valve body 15.

Figure 4:
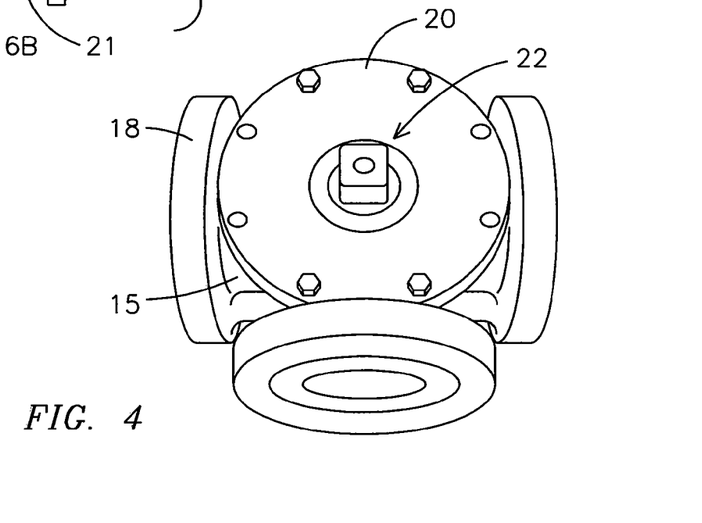
FIG. 4 is a top perspective view of the rotary valve.

Washers 17A and 17B are positioned on the top and bottom of the rotor 14 respectively. A top cover plate 20 and a bottom cover plate 21 are bolted to the valve body 15, and the washers 17A and 17B are disposed between the rotor 14 and the cover plates 20 and 21 enclosing the rotor 14 in the chamber 19. With respect to FIG. 4, a valve stem 22 mounted on the top of the rotor 14 protrudes through a hole in the top cover plate 20 and is connected to the actuator 13 for turning the rotor 14 to a desired position.

As shown in FIG. 6, the valve stem 22 includes a cylindrical base 23 and top tool engagement portion 24 on the base 23. At least a portion of the valve stem base 23 protrudes through the washer 17A and the cover plate 20, so the base 23 has a groove 26 for receiving an o-ring 34 to seal the rotor 14 in the valve body 15. When the o-ring 34 is exposed to caustic fluids at extremely high temperatures, the o-ring 34 may disintegrate causing the rotor valve 11 to leak. Moreover, the surface of the valve stem base 23 may deteriorate and become pocked which may also cause leaking. However, with respect to the present invention, the rotor 11 may be reconditioned to prevent leaking that may otherwise occur in such rotors 11.

In order to rebuild or recondition the rotor 11, external cleaning and testing of the valve 11 is preferably performed prior to disassembly of the valve 11. The external cleaning is performed using known procedures and equipment. For example, valve assembly 10 may be cleaned using steam cleaners or pressure washers that utilize any known mild degreasing agents.

Figure 3:
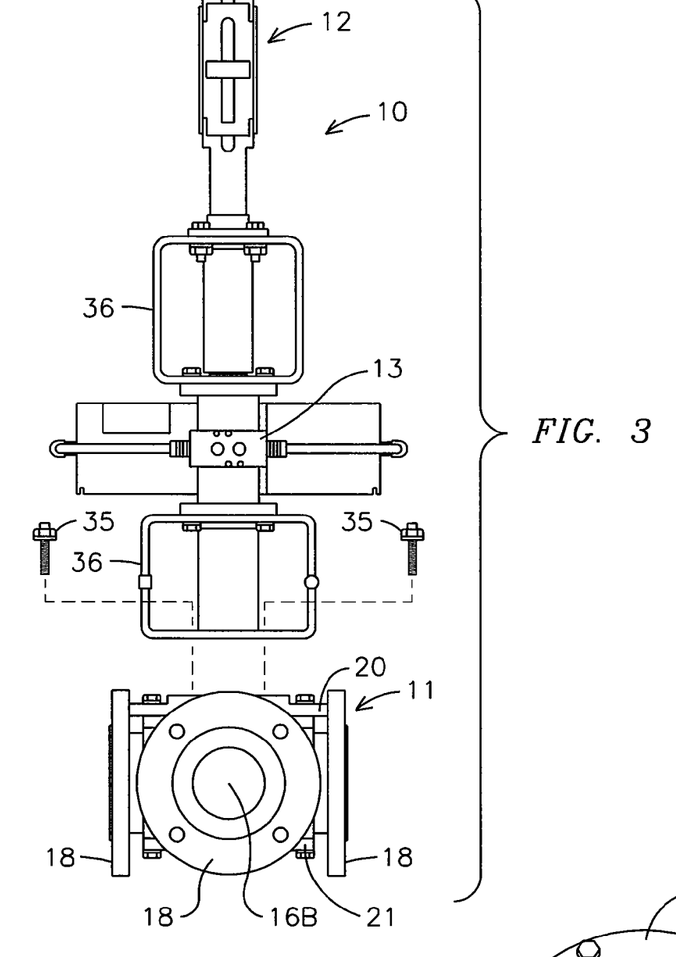
FIG. 3 is a front elevational of the flow control valve in FIG. 1 and 2 with the rotary valve removed.

As shown in FIG. 3, the rotor 11 is separated from the valve assembly 10 by removing bolts 35 that secure the rotor 11 to the actuator adaptor 36. The top cover plate 20 and the bottom cover plate 21 are removed by removing bolts 37 that secure the cover plates 20 and 21 to the valve body 15. The washers 17A and 17B are also removed after the cover plates 20 and 21 have been removed.

The rotor 14 is then pulled from the chamber 19. Typically, the valve stem 22 has a threaded aperture in the top portion 24 of the valve stem 22 so an eyebolt can be inserted and secured to the valve stem 22 to remove the rotor 14. The seal pads 32 are then removed from the chamber 19. All internal surface of the valve body 15, all surfaces of the rotor 14, including the valve stem 22, the cover plates 20 and 21 and the seal pads 32 are cleaned using known solvents and non-abrasive rags or Scotch Brite cleaning pads. All components are inspected and either repaired or replaced prior to reassembly.

The valve stem 22 and top cover plate 20 are adapted to reseal the interface between these two components. More specifically, the valve stem base 23 has an outside diameter that is reduced to receive a bushing 27 fitted over the valve stem 22. As shown in FIG. 7, the valve stem base 23 is machined or turned down to substantially eliminate the groove 26 in which the o-ring 34 was disposed. For example, in the above described tested valve assemblies the outside diameter of the valve stem 23 is reduced to about 1.600 inches or about 40.64 millimeters.

The bushing 27 is provided and fitted over the valve stem 23 to account for the reduced diameter of the valve stem 23 and provide a more durable valve stem 23 surface. In use in connection with the above-referenced valve assembly 10 the bushing 27 should be substantially the same height, 0.750 inches or 19.50 millimeters, as the valve stem base 23. The bushing 27 has an inside diameter that is slightly less than the outside diameter of the valve stem base 23 so the bushing 27 can be press fitted over the valve stem base 23. For example, the inside diameter of the bushing may be about 1.599 inches or 40.615 millimeters for a valve stem base 23 having an outside diameter of 1.600 inches or 40.64 millimeters. The bushing is preferably fabricated from 304-grade stainless steel, and finished so that all surfaces have a #8 surface finish. The bushing 27 is preferably heated in an oven at temperatures ranging from about 350° F. (177° C.) to about 375° F. (191° C.) for a resident time of about thirty to forty-five minutes. The bushing 27 is then pressed over the modified valve stem 22.

Figure 9:
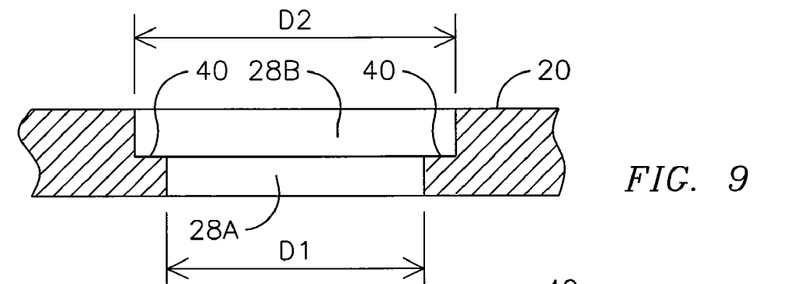
FIG. 9 is a sectional view of a top cover plate taken along line 9-9 in FIG.
Figure 10:
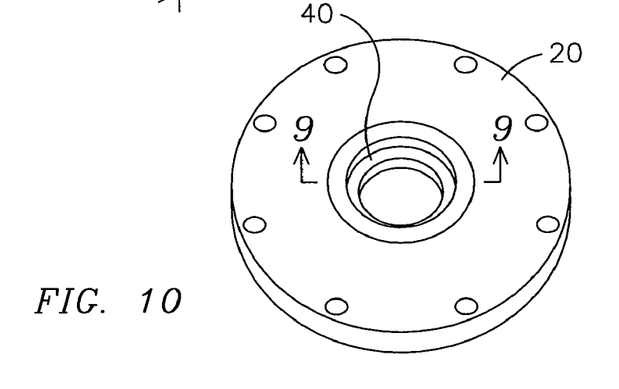
FIG. 10 is a top perspective view of a top cover plate of the rotary valve.

With respect to FIGS. 9 and 10, the top cover plate 20 has been adapted to receive a seal 29 that interfaces with the bushing 27 on the valve stem 22. The top cover plate 20 has a first bore 28A that has a first diameter D1. Prior to the modification of the top cover plate 20, the first bore 28A extends through the top cover plate 20 having a uniform first diameter D1. After the top cover plate is thoroughly cleaned using known methods and cleaning solvents, a second bore 28B is machined into the top of the cover plate 20 and coaxially aligned with the first bore 28A. The second bore 28B has a diameter D2 that is larger than the diameter D1 of the first bore 28A forming a lip 40 for receiving and/or seating the seal 29 on the top cover plate 20.

Figure 11:
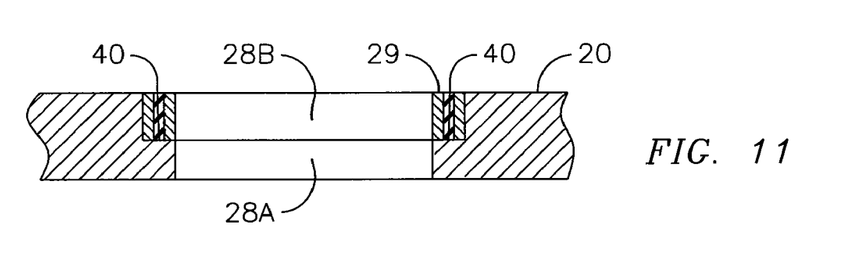
FIG. 11 is a sectional view of the top cover plate with a seal taken along line 11-11 in FIG. 12.
Figure 12:
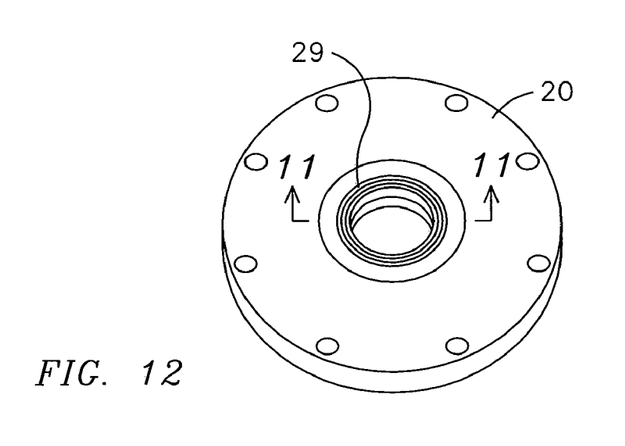
FIG. 12 is a top perspective view of the top cover plate with the seal.

The size of the second bore 28B, including its diameter D2 and depth of the second bore 28B, depends on the size of new seal 29 to be installed as shown in FIGS. 11 and 12. For example, a seal sold under the brand name "FlexSeal," manufactured by Parker-Hanafin, Inc., used in connection with this invention on the above referenced valve assemblies 10, required a top cover plate 20 having a thickness of 0.675 inches or 17.145 millimeters and the first bore 28A diameter of 2.001 inches or 50.825 millimeters. A second bore 28B machined into the top cover plate may have a diameter D2 of 2.500 inches or 63.500 millimeters, which bore 28B has a depth of about 0.430 inches or 10.922 millimeters.

Figure 13:
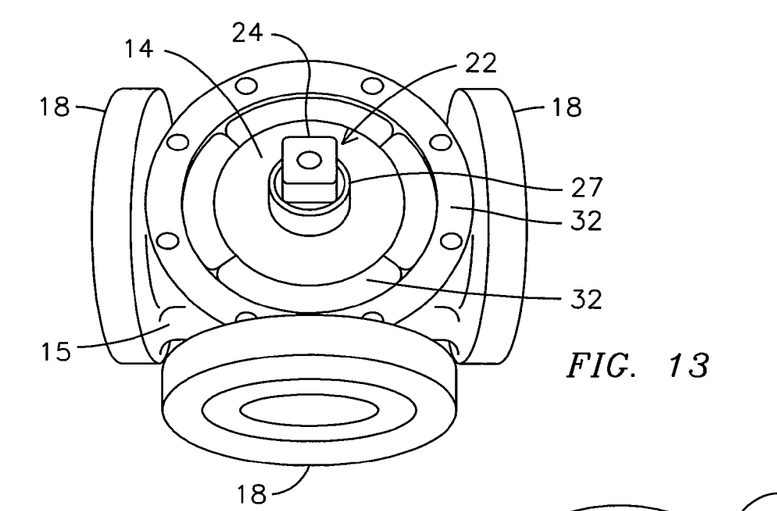
FIG. 13 is a top perspective view of the assembled rotary valve without a top washer.
Figures 14, 15:
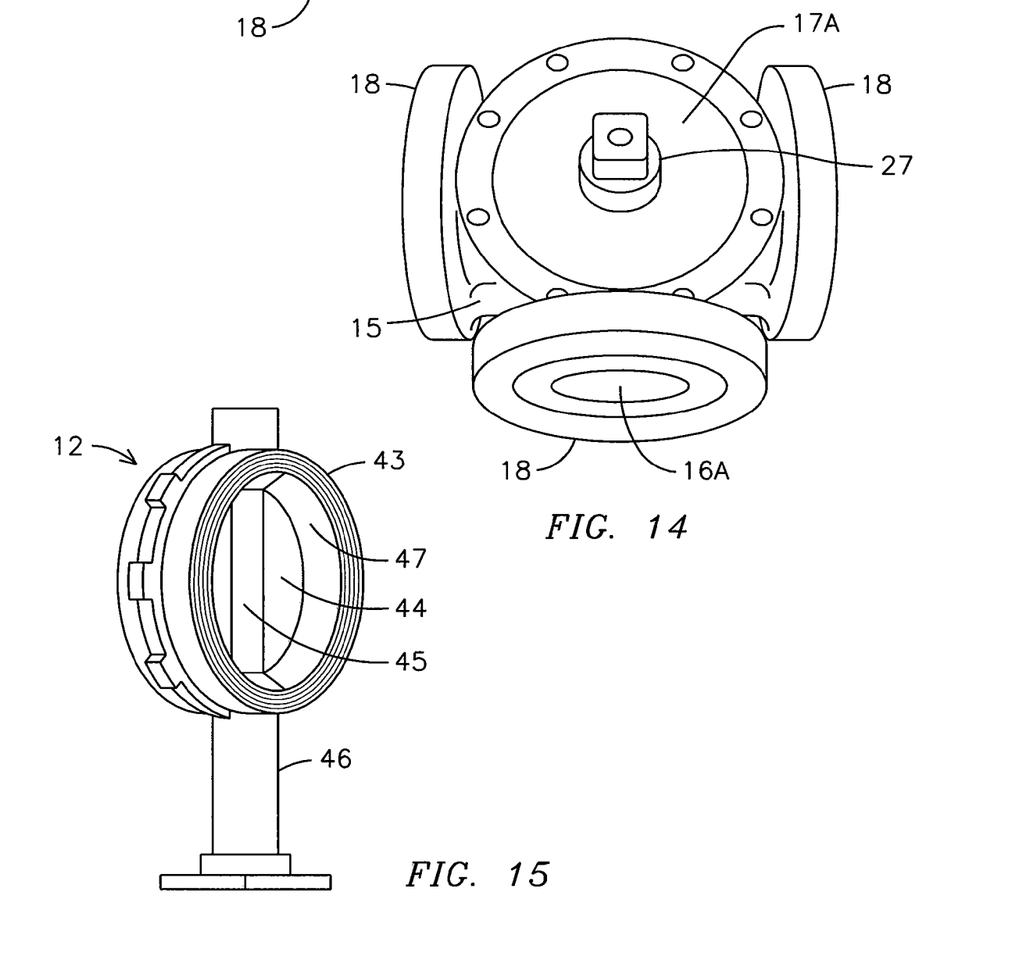
FIG. 14 is a top perspective view of the assembled rotary valve with the top washer.
FIG. 15 is a perspective view of the butterfly valve.

The assembly of the valve is represented in FIGS. 8, 13 and 14. The top cover plate 20 is cleaned and polished removing any debris or irregular surfaces, after the second bore 28B is formed in the top cover plate 20. The seal 29 is lubricated and seated within second bore 28B and on the top cover plate 20. The rotor valve 11 may then be reassembled.

The bottom cover plate 21 is affixed to the valve body 15. Then the washer 17B is installed in the bottom of the chamber 19 against the bottom cover plate 21. The rotor 14 is then positioned in the center of the chamber 19 with sufficient spacing between the rotor 14 and the wall of the chamber 19 to insert the seal pads 32. The openings 33 on the seal pads 32 must be aligned with respective ports 16A, 16B and 16C on the valve body 15. The washer 17A is then installed on top of the rotor 14. The rotor 11 is now prepared for installation of the top cover plate 20.

Figures 21, 22:
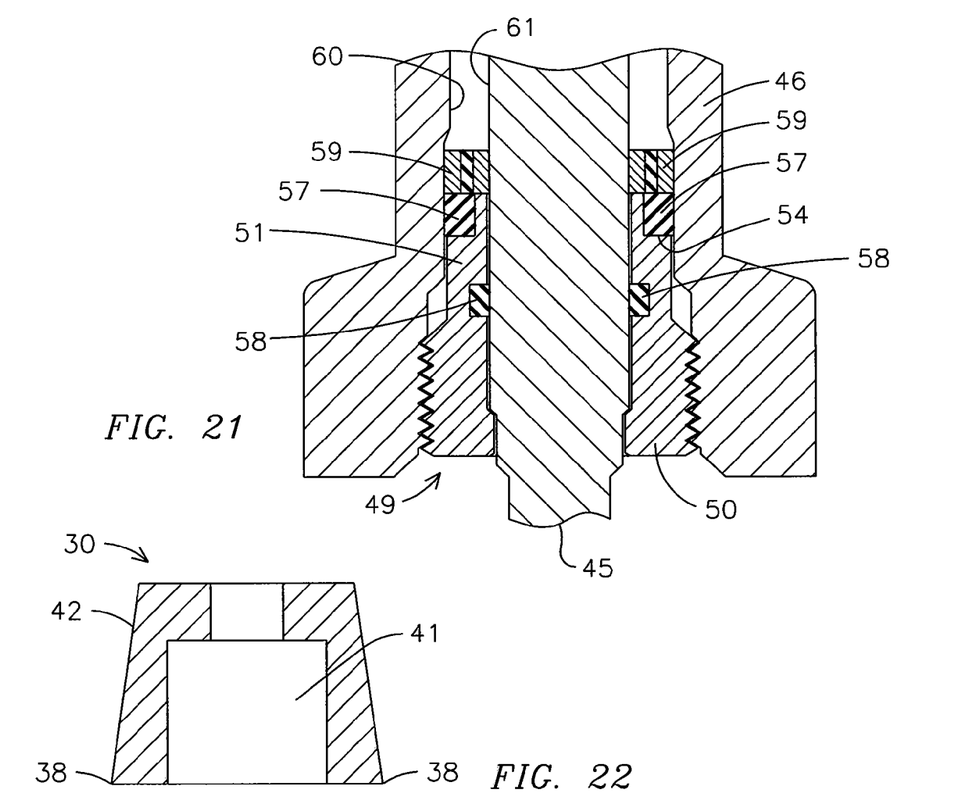
FIG. 21 is a sectional view of the bushing and seal installed in the butterfly valve stem housing.
FIG. 22 is a sectional view of a tool used to install sealed top cover plate of the rotary valve.

An installation tool 30 is preferably used to slip the top cover plate 20 over the valve stem 22. A sectional view of the installation tool 30 is depicted in FIG. 22 and includes an interior chamber 41 that corresponds to the size and shape of the top portion 24 of the valve stem 22 so the tool 30 rests snugly on the valve stem base 23. The tool 30 has a slightly tapered outside surface 42 so a bottom edge 38 of the tool 41 is substantially flush with a top edge of the valve stem base 23. In this manner, the top cover plate 20 can be slipped over the installation tool 30 and valve stem 22 without the seal 29 engaging the top edge of the valve stem base 23, which may damage the seal 29 during installation. The top cover plate 20 is then bolted to the valve body 15 and the rotor 11 is ready for installation and use.

The bushing 27 and new seal 29 provide more a reliable durable seal at the interface between the valve stem 22 and seal 29 to prevent leaking, as compared to the interface between the o-ring 34 and top cover plate 20. Moreover, the bushing 27 is fabricated from a stainless steel grade that is much more resistant to corrosive fluids and excessive temperatures of some fluid flow control systems as compared to the originally fabricated valve stem.

Figure 23:
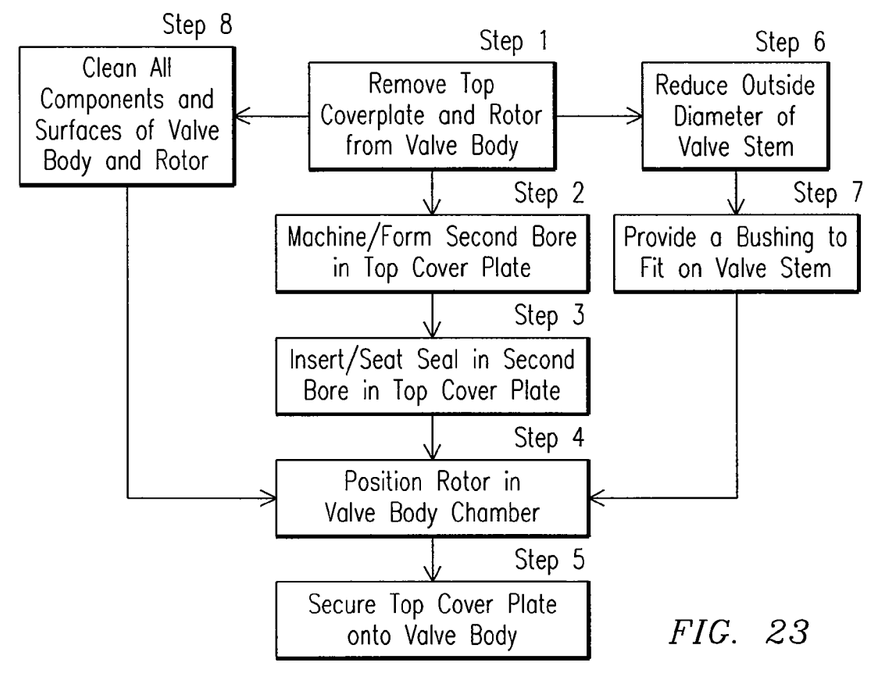
FIG. 23 is a flow chart describing steps in the method of rebuilding the rotor.

With respect to FIG. 23, a method for rebuilding the rotor 11 is described. Step 1 through Step 5 describes the steps used to position the seal 29 on the top cover plate 20. In steps 1 and 2, the top cover plate 20 is removed from the valve body 15; and, a bore 28B is formed in the top cover plate 20. The bore 28B is coaxially aligned with a first bore 28A through which the valve stem 22 on the rotor 14 protrudes. In step 3, the seal 29 is then seated in the second bore 28B in the top cover plate 20. The rotor 14 is then positioned in the valve body 15 and the top cover plate 20 is secured to the valve body 15. Steps 6 and 7 are alternative steps that may or may not be used to rebuild the rotor 11, and include the adaptation of the valve stem 22. Step 8 pertains to cleaning all components of the rotor before reassembly. The labeling of the steps 1 through 8 is not intended to limit the invention to a particular order but is for illustrative purposes only. For example, steps 6 and 7 may be performed before step 2 is performed.

With respect to FIGS. 15 through 21 a typical butterfly valve 12 is illustrated and modified to prevent leaking failure modes. The butterfly valve 12, shown in FIGS. 15, 16 and 17, includes a circular valve body 43 within which a disc-shaped valve 44 is positioned. The valve 44 includes a vertically disposed stem 45 that is connected to the actuator 13, which is shown in FIGS. 1 and 2, and rotates the valve 44 on its longitudinal axis about 90° between an open and closed position. A seal 47 is affixed to an inside surface of the valve body 43 to seal the interface between the valve 44 and valve body 43.

Figures 16, 17, 18, 19:
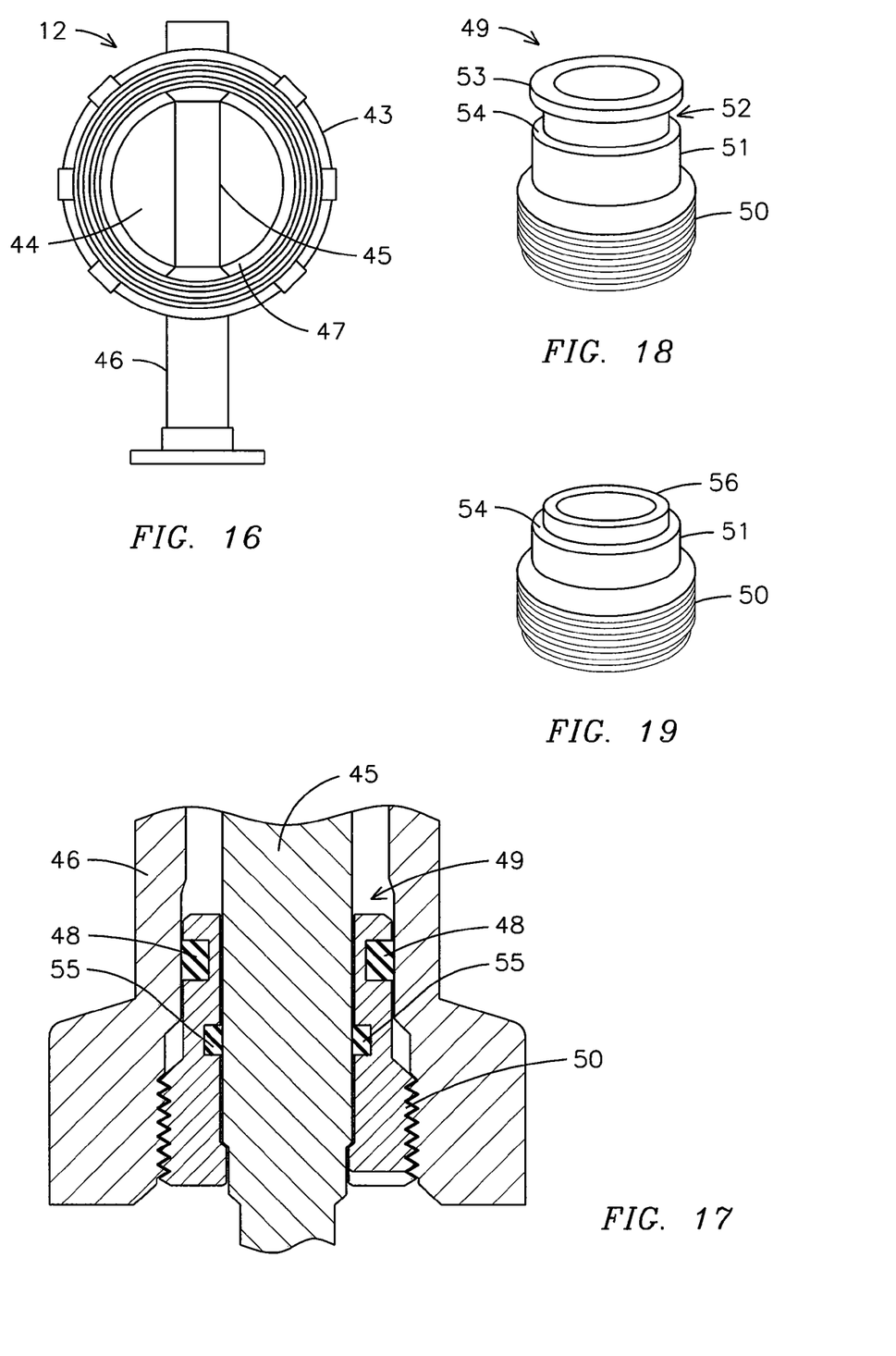
FIG. 16 is a front elevational view of the butterfly valve.
FIG. 17 is a sectional view of a butterfly valve stem.
FIG. 18 is a bushing taken from the butterfly valve stem.
FIG. 19 is the bushing of FIG. 18 machined to a desired specification.

The stem 45 is supported in a housing 46 between the valve body 43 and the actuator 13. At times fluid may leak from the butterfly valve 12 and migrate into the housing 43 in which the valve stem 45 is supported. Accordingly, a first o-ring 48 is supported in the housing 46 between the stem 45 and an inside surface of the housing 46 to prevent fluid from traveling to the actuator 13.

A bushing 49 is positioned in the housing 46 having a threaded base 50 and a top section 51 integral to the base 50. The first o-ring 48 is supported on the top section 51 of the bushing 49 within an annularly extending groove 52, so the first o-ring 48 abuts the inside surface of the housing 46. The groove 52 is defined by annularly extending rim 53 spaced above an annularly extending ledge 54.

As shown in FIG. 17 a second o-ring 55 is positioned internally on the bushing abutting the bushing 49 and an outside surface of the valve stem 45. The second o-ring 55 seals the interface between the inside surface of the valve stem 45 and the bushing 49 to prevent migration of fluid there through.

The butterfly valve 12 is reconditioned by removing the bushing 49 from the housing 46 and valve stem 45. With respect to the valve assembly that is shown in FIGS. 1 and 2. The butterfly valve 12 must be detached from an actuator adaptor 36 to access the inside of the housing 46, bushing 49 and valve stem 45. After the bushing 49 is removed from the housing 46, the first o-ring 48 and second o-ring 55 are removed from the bushing 49.

The bushing 49 is then machined to remove at least a portion of the top section 51 of the bushing 49 thereby reducing the overall height of the bushing 49. In the embodiment illustrated in FIGS. 18 and 19, the rim 53 is removed from the top section 51 forming a neck portion 56 protruding upward from the ledge 54. The amount of the top section 51 removed depends in part on the thickness of the seal 59 and new o-ring 58 referred to below. The height of the bushing 49 measured from the ledge 54 to a top of the new seal 59 is preferably substantially the same distance measured from the base of the groove 52 to a top of the rim 53 before the bushing 49 is machined. In this manner, the bushing 49, o-ring 58 and seal 59 fit within the housing 46 and seal the interface between the housing 46 and bushing 49.

Figure 20:
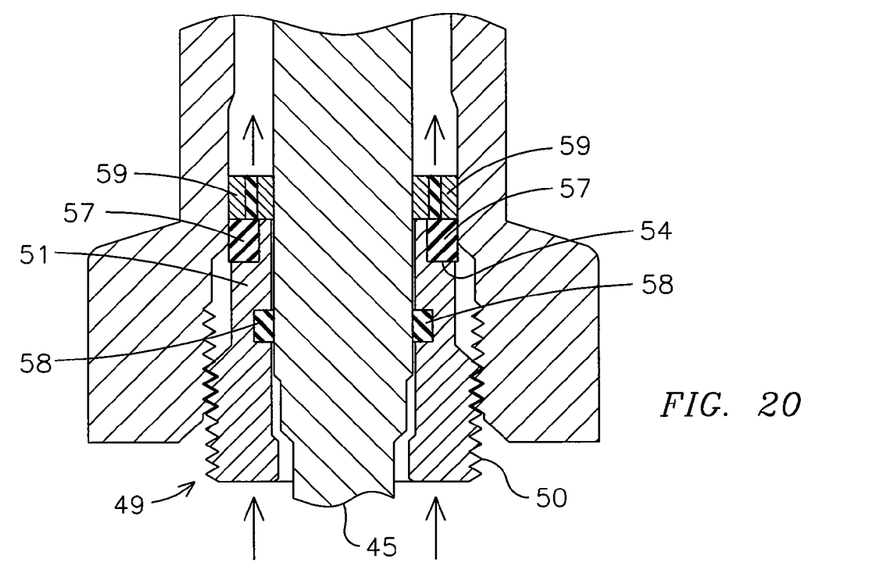
FIG. 20 is a sectional view of the butterfly valve stem with the bushing being inserted into a valve stem housing.

The bushing 49, housing 46 and valve stem 45 should be cleaned from any debris using known cleaning solutions and equipment in preparation for installation of new o-rings and new seals. The first o-ring 48 and the second o-ring 55 may be used again or are replaced with new o-rings 57 and 58 respectively. The valve stem seal 59 is then positioned on the valve stem 45 and within the housing 46. As shown in FIGS. 20 and 21, the seal 59 is preferably partially inserted in the housing 46 around the stem 45, and the bushing 49 is inserted in the housing 46 with the o-ring 58 abutting the seal 59. The bushing 49 is then rotated into position along a longitudinal axis of the stem 45, forcing or pushing the seal 59 along the stem 45.

In this manner the seal 59 is seated against an inside surface 60 of the stem housing 46, the outside surface 61 of the valve stem 45 and the o-ring 58. The valve stem seal 59 extends annularly around the valve stem 45 within the housing 46 sealing the gap between these two components. In addition, the seal 59 abuts or seats against the o-ring 59 and a top of the bushing 45. The butterfly valve 12 is now ready for installation and use. This particular arrangement, given the durability of the stem seal 59, shall increase the life of the butterfly. In the case of the valve assembly shown in FIGS. 1 and 2, the butterfly valve 12 is mounted to the adaptor actuator 13, so the valve stem 45 is connected to the actuator 13 for operation. A brand name seal that works well under high temperatures and against corrosive fluids is the "FlexSeal" seal that is manufactured by Parker-Hannifan, and can be purchased from various distributors including Sealing Devices, Inc. located in Erie, Pa.

Figure 24:
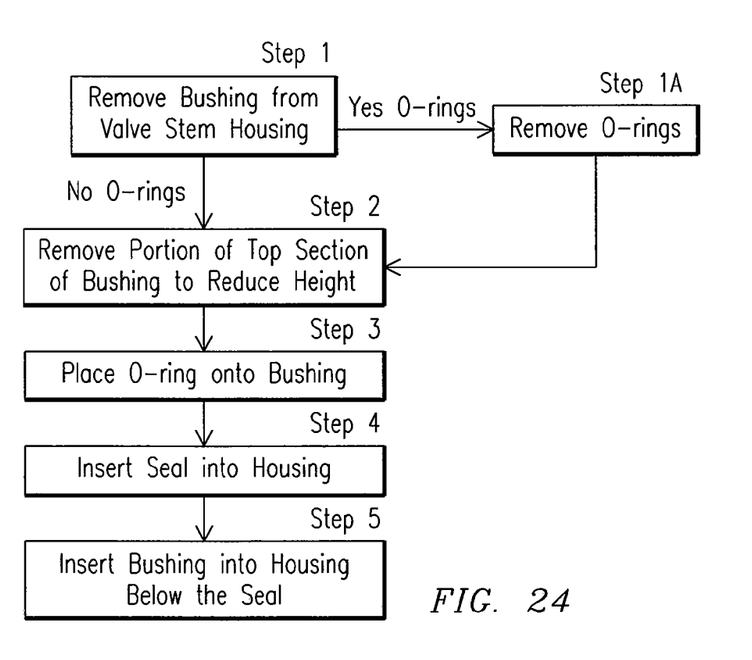
FIG. 24 is a flow chart describing steps in the method of rebuilding the butterfly valve.

With respect to FIG. 24, the method for rebuilding a butterfly valve 12 is illustrated in a flow chart. In Step 1 the bushing 49 is removed from the valve stem housing 46. Step 1A is provided as an alternative step in the event the bushing 46 has an o-ring or other sealing mechanism attached to it. Then a predetermined portion of the top section of the bushing is removed. With respect to Step 3, the o-ring 59 placed on the bushing 49 may include the same o-ring that has been removed or a new o-ring. In Steps 4 and 5, the seal 59 is inserted into the housing 46, and the bushing 49 is then inserted in the housing 46 behind, and in abutting relationship with the seal 59.

The labeling of the steps 1 through 5 is not intended to limit the invention to a particular order but is for illustrative purposes only. For example, Steps 3 and 4 may be performed simultaneously whereby the seal 59 is partially inserted in the housing 46 and the bushing 49 is inserted and threaded into the housing 46 to seat the seal 59 in position within the housing 46 and seat the seal 59 against the o-ring 58 and bushing 49.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the brief description of the invention.

What is claimed is:

1. A method for rebuilding a flow control valve, comprising the steps of:
    providing a flow control valve having a rotor positioned in a chamber of a valve body, and the rotor having a valve stem, which has an outside diameter, and a top cover plate mounted to the valve body having a first bore through which the valve stem protrudes, and the first bore having a diameter;
    removing the top cover plate and rotor from the valve body;
    reducing the outside diameter of at least a portion of the valve stem to a predetermined outside diameter;
    positioning a bushing on the valve stem over the portion of the valve stem of which the diameter has been reduced;
    forming a second bore in the top cover plate that is coaxially aligned with respect to the first bore and the second bore having a diameter that is larger than the diameter of the first bore thereby forming a lip between the first bore and second bore;
    positioning a seal on the lip in the top cover plate;
    inserting the rotor into the valve chamber of the valve body; and
    positioning the top cover plate over the rotor so the valve stem protrudes through the first bore and second bore in the top cover plate, and the seal is disposed between the top cover plate and the bushing on the valve stem.

2. The method of claim 1 further including the step of cleaning any surfaces of the rotor and the valve body.

3. The method of claim 1 wherein an o-ring is positioned on the valve stem and the method further comprises the step of removing the o-ring.

4. The method of claim I wherein the flow control valve has a plurality of seal pads disposed between the rotor and the valve body, and the method comprises the steps of removing the seal pads, cleaning the seal pads and inserting the seal pads in the valve body between the rotor and valve body.

5. The method of claim 1 wherein the flow control valve includes a bottom cover plate mounted to the valve body and the method further comprises the steps of removing the bottom cover plate and mounting the bottom cover plate to the valve body before inserting the rotor into the valve body.

6. The method of claim 5 wherein the flow control valve includes a first washer disposed between the top cover plate and the rotor and a second washer disposed between the bottom cover plate and the rotor, and the method further comprises the steps of removing the first washer and second washer after the top cover plate and bottom cover plate have been removed and positioned the second washer in the valve body after attaching the bottom cover plate to the valve body and before the rotor is inserted into the valve body, then positioning the first washer over the rotor after inserting the rotor in the valve body and before attaching the top cover plate to the valve body.

7. A method for rebuilding a flow control valve, comprising the steps of:
    providing a flow control valve having a rotor positioned in a chamber of a valve body, and the rotor having a valve stem having an outside diameter, and the flow control valve having a top cover plate mounted thereon wherein the top cover plate has a first bore through which the valve stem protrudes;
    removing the top cover plate from the flow control valve;
    removing the rotor from the valve body;
    reducing an outside diameter of at least a portion of the rotor valve stem;
    adapting the valve stem to account for the reduced diameter;
    positioning a seal on the top cover plate along the first bore by forming a second bore in the top cover plate that is coaxially aligned with respect to the first bore and the second bore having a diameter that is larger than the diameter of the first bore thereby forming a lip between the first bore and second bore, and positioning the seal on the lip in the top cover plate;
    inserting the rotor into the valve chamber of the valve body; and
    positioning the top cover plate over the rotor so the valve stem protrudes through the first bore in the top cover plate, and the seal is disposed between the top cover plate and the valve stem.

8. A method for rebuilding a flow control valve, comprising the steps of:
- providing a flow control valve having a rotor positioned in a chamber of a valve body, and the rotor having a valve stem having an outside diameter, and the flow control valve having a top cover plate mounted thereon wherein the top cover plate has a first bore through which the valve stem protrudes;
- removing the top cover plate from the flow control valve;
- removing the rotor from the valve body;
- reducing an outside diameter of at least a portion of the rotor valve stem to a predetermined outside diameter;
- adapting the valve stem to account for the reduced diameter;
- positioning a bushing on the valve stem over the portion of the valve stem of which the diameter has been reduced;
- positioning a seal on the top cover plate along the first bore;
- inserting the rotor into the valve chamber of the valve body; and
- positioning the top cover plate over the rotor so the valve stem protrudes through the first bore in the top cover plate, and the seal is disposed between the top cover plate and the valve stem.

* * * * *